(12) United States Patent
Petty et al.

(10) Patent No.: US 10,647,095 B2
(45) Date of Patent: May 12, 2020

(54) SURFACE TREATMENT FOR TAPE ADHESION AND ULTRAVIOLET STABILITY

(71) Applicants: Charles Petty, Blairstown, NJ (US);
David Indyke, Hackettstown, NJ (US);
Hal Robbins, Langhorne, PA (US);
Timothy John Koblish, Stroudsburg, PA (US)

(72) Inventors: Charles Petty, Blairstown, NJ (US);
David Indyke, Hackettstown, NJ (US);
Hal Robbins, Langhorne, PA (US);
Timothy John Koblish, Stroudsburg, PA (US)

(73) Assignee: Lamtec Corporation, Mt. Bethel, PA (US)

(*) Notice: Subject to any disclaimer, the term of this patent is extended or adjusted under 35 U.S.C. 154(b) by 117 days.

(21) Appl. No.: 14/097,175

(22) Filed: Dec. 4, 2013

(65) Prior Publication Data

US 2014/0357142 A1    Dec. 4, 2014

Related U.S. Application Data

(60) Provisional application No. 61/733,532, filed on Dec. 5, 2012.

(51) Int. Cl.
*B32B 27/30* (2006.01)
*B32B 7/12* (2006.01)
(Continued)

(52) U.S. Cl.
CPC ............ *B32B 27/308* (2013.01); *B32B 5/028* (2013.01); *B32B 7/12* (2013.01); *B32B 27/08* (2013.01);
(Continued)

(58) Field of Classification Search
CPC ... B32B 27/308; B32B 27/304; B32B 27/302;
B32B 27/40; B32B 27/34; B32B 27/36;
B32B 27/32; B32B 27/08; B32B 7/12;
B32B 5/028; B32B 2262/101; B32B
2307/714; F16L 59/026; F16L 59/029;
F16L 59/08; F16L 59/145; F16L 59/028;
Y10T 428/31721; Y10T 428/3192; Y10T
428/31928; Y10T 428/31935;
(Continued)

(56) References Cited

U.S. PATENT DOCUMENTS 2,750,314 A * 6/1956 Bemmels ............... C09J 7/0296
138/DIG. 10
3,552,994 A * 1/1971 Dipner ..................... C09J 7/04
428/352
(Continued)

FOREIGN PATENT DOCUMENTS

GB         1021242 A   *  3/1966    ............ H01B 3/004

*Primary Examiner* — Elizabeth C Imani
(74) *Attorney, Agent, or Firm* — Joseph E. Maenner;
Maenner & Associates, LLC

(57) ABSTRACT

A surface-treated polymer film is disclosed. The film has a polymer substrate having a first surface and an opposing second surface and a primer applied to the first surface of the substrate. The primer is a cross-linked acrylic polymer or other suitable polymer. A method of insulating a surface with an insulation material constructed from the surface-treated polymer is also disclosed.

16 Claims, 12 Drawing Sheets

(51) Int. Cl.
- *B32B 5/02* (2006.01)
- *B32B 27/08* (2006.01)
- *F16L 59/02* (2006.01)
- *F16L 59/14* (2006.01)
- *F16L 59/08* (2006.01)
- *B32B 27/32* (2006.01)
- *B32B 27/34* (2006.01)
- *B32B 27/40* (2006.01)
- *B32B 27/36* (2006.01)

(52) U.S. Cl.
CPC .......... *B32B 27/302* (2013.01); *B32B 27/304* (2013.01); *B32B 27/32* (2013.01); *B32B 27/34* (2013.01); *B32B 27/36* (2013.01); *B32B 27/40* (2013.01); *F16L 59/026* (2013.01); *F16L 59/028* (2013.01); *F16L 59/029* (2013.01); *F16L 59/08* (2013.01); *F16L 59/145* (2013.01); *B32B 2262/101* (2013.01); *B32B 2307/304* (2013.01); *B32B 2307/714* (2013.01); *Y10T 156/10* (2015.01); *Y10T 428/3192* (2015.04); *Y10T 428/31544* (2015.04); *Y10T 428/31576* (2015.04); *Y10T 428/31721* (2015.04); *Y10T 428/31743* (2015.04); *Y10T 428/31797* (2015.04); *Y10T 428/31913* (2015.04); *Y10T 428/31928* (2015.04); *Y10T 428/31935* (2015.04); *Y10T 442/10* (2015.04)

(58) Field of Classification Search
CPC .......... Y10T 428/31576; Y10T 442/10; Y10T 428/31797; Y10T 428/31743; Y10T 428/31544; Y10T 428/31913
See application file for complete search history.

(56) References Cited

U.S. PATENT DOCUMENTS

| | | | |
|---|---|---|---|
| 2004/0161620 A1* | 8/2004 | Tanaka | B32B 27/36 428/473.5 |
| 2008/0081138 A1* | 4/2008 | Moore | B32B 15/04 428/36.1 |

* cited by examiner

| 15°F TAPE ADHESION; SHORT DWELL ||||||
|---|---|---|---|---|---|
| TAPE IDENTIFICATION | TAPE TYPE | TO STD. WMP-ASJ (No Primer) | TO WMP-ASJ (with Primer, T-2598) | | |
| 2C252 | SSL | 2 | 4 | | |
| RD7752 | " | 2 | 4 | | |
| 04/09 | " | 2 | 3 | | |
| TR6921 | " | 1 | 2 | | |
| | | | | | |
| 2C106LT | BUTT STRIP | 2.5 | 5 | | |
| 11/09 | " | 2.5 | 5 | | |
| TR6941 | " | 2.5 | 4 | | |
| IPG | " | 2 | 3.5 | | |
| TR6933 | " | 1 | 2 | | |
| TR6906 | " | 1 | 2 | | |
| TR6934 | " | To be tested | | | |
| Applied with two firm squeegee passes on flat, firm surface. Peeled after three days. ||||||
| | | 1 | Extremely light tack, tail lifting | | |
| | | 2 | Light tack | | |
| | | 3 | Fair tack | | |
| | | 4 | Good tack | | |
| | | 5 | Excellent tack, substrate failing | | |

FIG. 8

| 28°F OUTDOOR TAPE ADHESION; 3 DAY DWELL | | | | | |
|---|---|---|---|---|---|
| | | | | | |
| TAPE IDENTIFICATION | | TO STD WMP-ASJ (No Primer) | TO WMP-ASJ (with Primer, T-2598) | | |
| 2C252 | | 2.5 | 4 | | |
| TR6921 | SSL | 2 | 4 | | |
| | | | | | |
| 2C106LT | BUTT STRIP | 2.5 | 5 | | |
| TR6906 | | 2 | 5 | | |
| | | | | | |
| Applied with two firm squeegee passes on flat, firm surface. Peeled after three days | | | | | |
| | | | | | |
| | | 1 | Extremely light tack, tail lifting | | |
| | | 2 | Light tack | | |
| | | 3 | Fair tack | | |
| | | 4 | Good tack | | |
| | | 5 | Excellent tack, substrate failing | | |

FIG. 8
(Continued)

| Sample Description | Peel with gauge, lb/3 in at 20 F |
|---|---|
| WMP-ASJ with primer coated film | 0.6 - 1.0 |
| Uncoated WMP-ASJ, as is | 0.05 |

FIG. 8A

SSL Adhesion Performance at Room Temperature

| Creep (in./hour) | | | Shear Static (Min. to Fail) | | | Peel Dynamic (lb./in) | | |
|---|---|---|---|---|---|---|---|---|
| ASI+/252 | Primer/252 | Primer/ADH1 | ASI+/252 | Primer/252 | Primer/ADH1 | ASI+/252 | Primer/252 | Primer/ADH1 |
| 5.95 | 1.25 | 0.55 | 4.4 | 30.6 | 76.2 | 2.13 | 2.47 | 3.66 |
| 6.06 | 0.85 | 0.5 | 8.6 | 33.7 | 54.6 | 2.3 | 2.9 | 3.5 |
| | | | 12.4 | 40.6 | 67.8 | 2.06 | 2.66 | 3.3 |
| | | | 12.7 | 32.1 | 93.2 | 2.02 | 2.77 | 3.28 |
| 6.01 | 1.05 | 0.53 | 9.53 | 34.25 | 72.95 | 2.13 | 2.7 | 3.52 |
| | | | | | | | | 3.84 |

FIG. 9

| Sample Description | mg/ 6.49 in² | mg/ 100 in² |
|---|---|---|
| WMP-ASJ with no integral anti-stat in polymer film and no primer coating. | 8.472 | |
| | 6.470 | |
| | 4.929 | |
| | 6.624 | 102.1 |
| | | |
| | | |
| WMP-ASJ with integral anti-stat in polymer film and no primer coating. | 3.697 | |
| | 3.543 | |
| | 2.619 | |
| | 3.286 | 50.6 |
| | | |
| WMP-ASJ with integral anti-stat in polymer film and primer coating. | 2.157 | |
| | 3.389 | |
| | 2.465 | |
| | 2.670 | 41.1 |
| | | |
| WMP-ASJ with integral anti-stat in polymer film and primer coating with anti-stat "A". | 1.078 | |
| | 0.308 | |
| | 1.078 | |
| | 0.821 | 12.7 |
| | | |
| WMP-ASJ with integral anti-stat in polymer film and primer coating with anti-stat "B". | 0.154 | |
| | 0.000 | |
| | 0.000 | |
| | 0.051 | 0.8 |
| | | |
| | | |

FIG. 10

MULLEN TEST COMPARISON
Various films

FILM BEFORE EXPOSURE

| White Coated Polypropylene | Altopro LUV STD film |
|---|---|
| 34 | 32 |
| 37 | 33 |
| 35 | 34 |
| 36 | 33 |
| AVG: 35.5 | 33.0 |

AFTER 3000 HRS QUV EXPOSURE

| White Coated Polypropylene | Altopro LUV STD film |
|---|---|
| 35 | 20 |
| 33 | 18 |
| 32 | 22 |
| 30 | 20 |
| AVG: 32.5 | 20.0 |
| % Loss 8.5 | 39.4 |

AFTER 6000 HRS QUV EXPOSURE

| White Coated Polypropylene | Altopro LUV STD film |
|---|---|
| 21 | 11 |
| 28 | 3 |
| 29 | 8 |
| 28 | 2 |
| AVG: 26.5 | 6.0 |
| % Loss 25.4 | 81.8 |

FIG. 14

SURFACE TREATMENT FOR TAPE ADHESION AND ULTRAVIOLET STABILITY

CROSS-REFERENCE TO RELATED APPLICATION

This application claims priority from U.S. Provisional Patent application Ser. No. 61/733,532, filed on Dec. 5, 2012, which is incorporated by reference herein in its entirety.

FIELD OF THE INVENTION

This invention is in the field of polymer films and more specifically relates to improving the adhesion of pressure-sensitive adhesives to a polymer surface and to improving the ultraviolet ("UV") stability of a polymer surface.

BACKGROUND OF THE INVENTION

Insulation products are widely relied upon in the commercial and residential construction industries to provide thermal, acoustical, and moisture control properties between two spaces. Some applications require an insulation having a facing material composed of a functional laminate that may impart useful characteristics such as low moisture vapor permeance, durability, resistance to surface-wear, dust resistance, flame resistance, and fire retardance. Constituent layers of the laminate are selected to impart, individually or in combination, these useful characteristics. The constituent layers are then joined by means known in the industry to form a suitable facing laminate.

To date, a laminate commonly used as an insulation facing material has been a multi-layer construction consisting of an exposed layer of high-intensity-white kraft paper, a fire-retardant adhesive, a fiberglass reinforcing layer, a barrier coating, and an aluminum-foil backing layer. This paper-surfaced laminate has been used for insulation products that are installed in metal and wood buildings, to ductwork, and piping. Where adjacent insulation products need to be joined, they are typically taped using a pressure-sensitive adhesive tape along their edges to provide a uniform surface. Because some insulation installations are performed in uncontrolled temperature environments, cold temperature can make taping insulation together difficult insofar as the pressure-sensitive adhesives of most tapes are temperature sensitive.

When used to insulate flat surfaces such as roofs, walls and square ductwork, the conventional insulation may be flat boards or insulation batts of mineral wool or foam with a vapor retarding facing material affixed to one side. The facing material may have an exposed surface of aluminum foil, plastic film or paper.

When used to insulate pipes, the conventional insulation product is typically a pre-formed cylinder of insulating material with the paper-surfaced laminate covering the exterior, its high-intensity-white kraft paper exposed. A longitudinal slit along the cylindrical insulation product's length facilitates installation around piping. The longitudinal slit can be closed and sealed with a factory-supplied pressure-sensitive adhesive tape that is applied to the underside of the extended flap of the outer facing material laid along to join the seam. Lengths of insulation product are fit together onsite by a contractor by abutting standard or field cut lengths and fastening them together with tape or mastic if desired. The white kraft based facing laminate applied to these cylindrical paper-surfaced insulation products have come to be known in the industry as "All Service Jacket."

Despite the widespread acceptance and commercial success of the current All Service Jacket, a market exists for an alternative facing material to jacket insulation products with further improved characteristics such as enhanced cleanability, and superior resistances to surface wear, reduced dust accumulation, and improved UV-light stability. An improved insulation product also would have a surface that combines the above-mentioned properties with improved receptivity to pressure sensitive adhesives to facilitate the taping of seams and joints during its installation at a full range of jobsite temperature. The surface of the jacketing should also be compatible with, and form good bonds to water and solvent based mastics and paints used in the industry.

SUMMARY OF THE INVENTION

A first embodiment of the present invention is a polymer substrate treated with a primer to improve the substrate surface's receptivity to a pressure sensitive adhesive, mastics and paints.

A second embodiment of the present invention is a polymer substrate treated with a primer to improve the substrate surface's resistance to dust accumulation.

A third embodiment of the present invention is a polymer substrate treated with a primer to improve the substrate's resistance to degradation by UV-light.

A fourth embodiment of the present invention is a foil or metallized polymer substrate treated with a primer to improve the substrate's resistance to corrosion and/or degradation by UV-light.

A fifth embodiment of the present invention is a laminate having an exposed primer-treated polymer substrate with improved receptivity to pressure-sensitive adhesive, resistance to dust accumulation, and/or degradation by UV-light.

A sixth embodiment of the present invention is a pipe insulation composite having a tubular core of insulation and a laminate fixed to its exterior that has an exposed primer-treated polymer substrate with improved receptivity to pressure-sensitive adhesive, resistance to dust accumulation, and/or improved UV-light stability.

A seventh embodiment of the present invention is a method of improving the pressure-sensitive adhesive receptivity and UV stability of a polymer film by applying a primer to the polymer film.

An eighth embodiment of the invention is a method of imparting to a laminate surface, using a primer treatment: color, antiglare properties, good pressure-sensitive tape adhesion at a full range of application temperature and relatively high humidity, and/or corrosion resistance.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 8 is a table summarizing comparative low-temperature (15° F. and 28° F.) tape testing on pipe jackets.

FIG. 8A is a table quantifying low temperature tape adhesion on an inventive polymer film substrate with and without primer coating.

FIG. 9 is a table summarizing comparative room-temperature self-seal lap adhesion testing on pipe jackets.

FIG. 10 is a table summarizing quantitative dust accumulation tests of pipe jackets.

FIG. 14 is a table illustrating comparative accelerated UV aging results of an inventive film versus a prior art film using a Mullen Burst Test.

DETAILED DESCRIPTION

Figure 1:
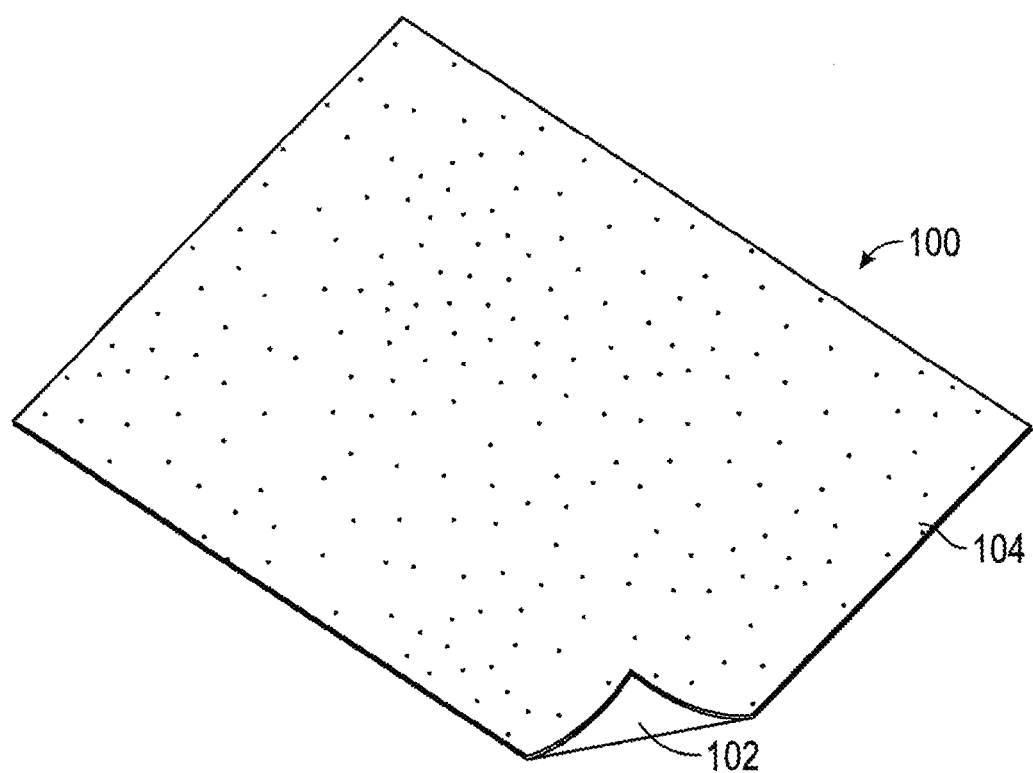
FIG. 1 is a perspective view of an inventive polymer film substrate that includes a primer coating on the top surface.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

As shown in FIG. 1, a treated polymer film 100 of the subject invention includes polymer film substrate 102. Substrate 102 can be manufactured from any polymer with characteristics suitable for the intended purpose of film 100. For example, substrate 102 can be composed, of acrylic, polypropylene, polyethylene, polyvinyl chloride, nylon, polyvinylidene chloride, polyurethane, polyethyleneterephthalate, thermoplastic polyolefin, polyvinylfluoride, polyvinylidene flouride, polyethylene napthalate, polyimide polyamide, and polystyrene, or mixtures thereof. Polymer film 102 can optionally include, either integrally or as a surface treatment, one or more antistatic compounds.

Such antistatic compounds are generally known in the industry and may include charge dissipaters such as long-chain aliphatic amines and amides, quaternary ammonium salts, esters of phosphoric acid, polyethylene glycol esters, polyols, mineral oils and non-migratory polymeric and inorganic anti-stats. Additionally, lubricants and waxes can be added to reduce the friction of the outer surface of substrate 102 when in contact with itself or other objects.

One face of film 100 further includes a surface coating of primer 104. Primer 104 can be a suitable polymer, such as a cross-linked acrylic polymer, that provides: improved adhesion to the film, higher surface energy, improved surface wetting of pressure-sensitive adhesives, mastics, and paints when applied to film 100, and a more active surface for bonding to pressure sensitive adhesives and mastics such as those used in closure systems. Pressure sensitive adhesives and mastics can be acrylic or rubber based or other synthetic polymer. Coating polymers can be acrylic, urethane, rubber, PVDC, PVC, EVA or other suitable coating materials. Primer 104 can also include a light-stable acrylic polymer that is pigmented to provide a shielding layer for substrate 102, thereby reducing the level of energy able to reach the surface of film 100 and cause damage.

Figure 2:
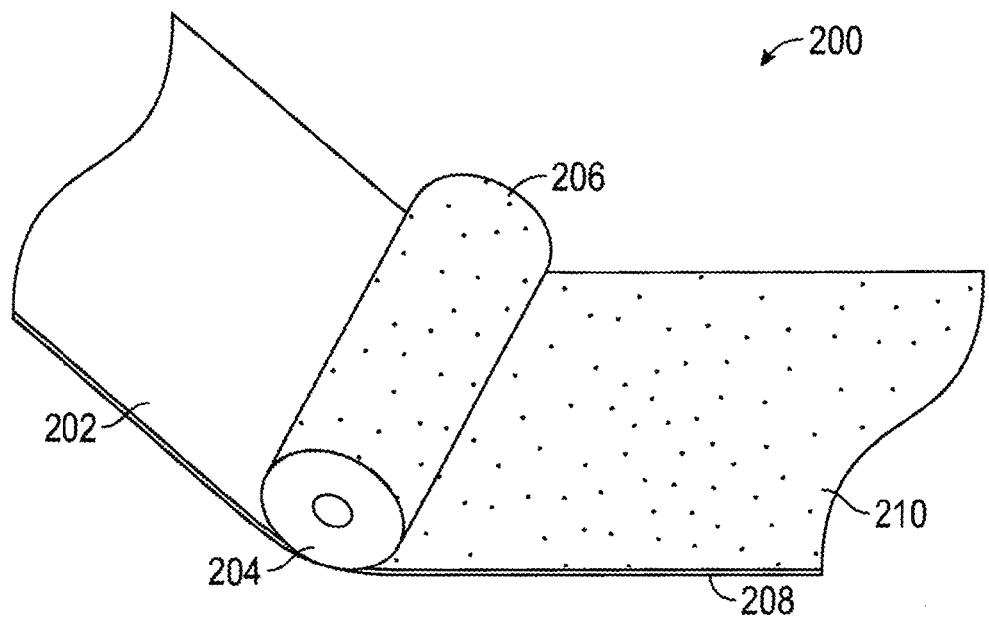
FIG. 2 is a perspective view illustrating a system for manufacturing a polymer film substrate with a primer coating on one surface.

FIG. 2 illustrates one method for applying primer 206 to the surface of a polymer substrate 202 using roller 204. As polymer substrate 202 contacts roller 204, a layer of primer 206 is deposited on surface 210 to yield treated polymer film 208.

Figure 3:
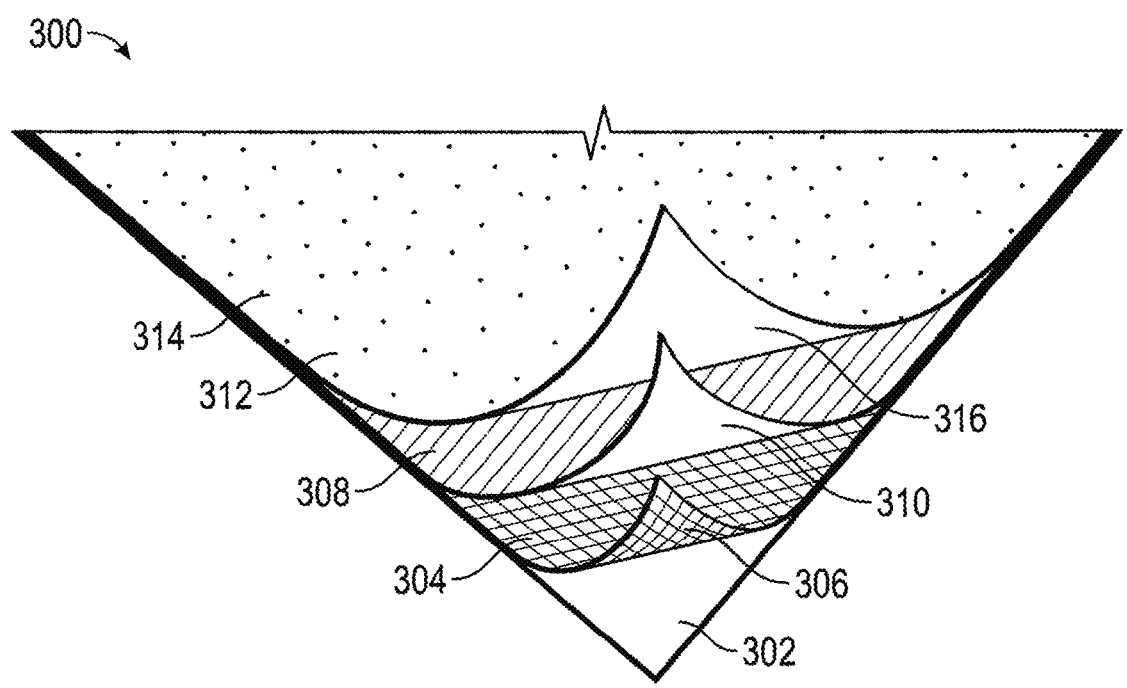
FIG. 3. is a perspective view illustrating the cross-section of a laminate having a primer-treated polymer face.

As shown in FIG. 3, one embodiment of the present invention is a laminate 300. The first layer of laminate 300 is base layer 302, which can be composed of aluminum foil, a polymer film, or extrusion that may or may not contain a low-barrier or decorative coating. Base layer 302 provides both support and barrier properties for laminate 300.

Atop base layer 302 is barrier coating adhesive 306 to improve the abuse resistance of the underlying layer and help maintain barrier properties. Affixed to barrier coating 306 is scrim 304. Scrim 304 can be a woven material or individual yarns whose lattice can be oriented in any direction with respect to laminate 300. Optional materials for scrim 304 include fiberglass reinforcing yarn, polyester yarns or any other suitable synthetic or natural fibers.

Atop scrim 304 is affixed porous media sheet 308. Materials for media sheet 308 can include but are not limited to, kraft paper that is between 10 and 55 pounds/3000 square feet, nonwoven glassmats, nonwoven polymeric sheets, and thin polymeric foams of varying chemical compositions. Media sheet 308 is fixed to scrim 304 with adhesive 310.

Atop media sheet 308 is affixed primer-treated polymer film 312 with the primer-treated polymer surface 314 exposed. Primer-treated polymer film 312 is fixed to media sheet 308 with adhesive 316. The primer treatment may be applied to the polymer substrate before, during, or after laminate 300 is bonded together. The order of the constituent layers of laminate 300 may be changed with respect to each other so long as polymer film 312 comprises one exposed surface. Polymer film 312 may also have a low permeance layer on the internal face of the film, for improved barrier properties. The low barrier coating may include, but is not limited to, metal, metal oxides, and organic and inorganic coatings.

Any of the constituent layers of laminate 300, including adhesives 306, 310, and 316, may include one or more additives formulated to provide additional flame resistance, fire retardance, microbial growth resistance, barrier properties, and/or abuse resistance.

Application of the primer surface 104 is also contemplated for non-polymer substrates such as foils or metallized polymers in order to: impart color, reduce glare, improve pressure-sensitive or mastic adhesion, and/or corrosion resistance. Such primer-treated non-polymer substrates could then be used to construct functional laminates for insulation facing.

Figure 4:
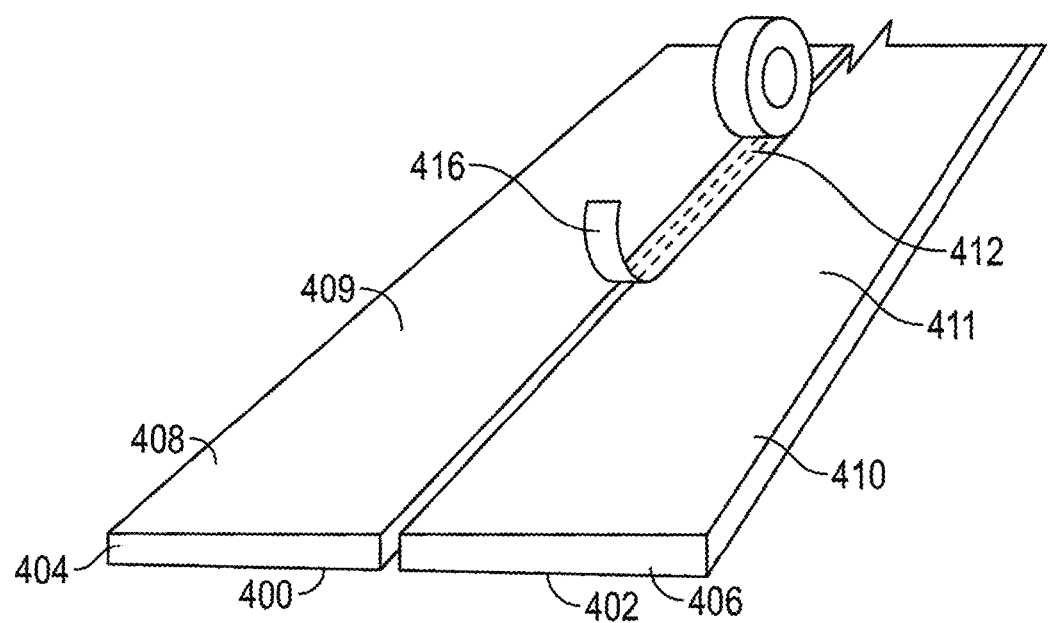
FIG. 4. is a perspective view illustrating two abutting laminate-faced insulation products.

FIG. 4. illustrates two adjacent insulation product boards or batts 400 and 402. Boards or batts 400 and 402 include insulation cores 404 and 406, respectively. Affixed to cores 404 and 406 are laminates 408 and 410, respectively, with exposed primer-treated polymer surfaces 409 and 411. FIG. 4 depicts a typical construction application for insulation product boards or batts 400 and 402 wherein boards or batts 400 and 402 would be butted together and taped using a pressure sensitive tape 412. When applied, pressure-sensitive adhesive face 416 of tape 412 bonds to the primer-treated surface 409 and 411 on boards or batts 400 and 402.

Figure 5:
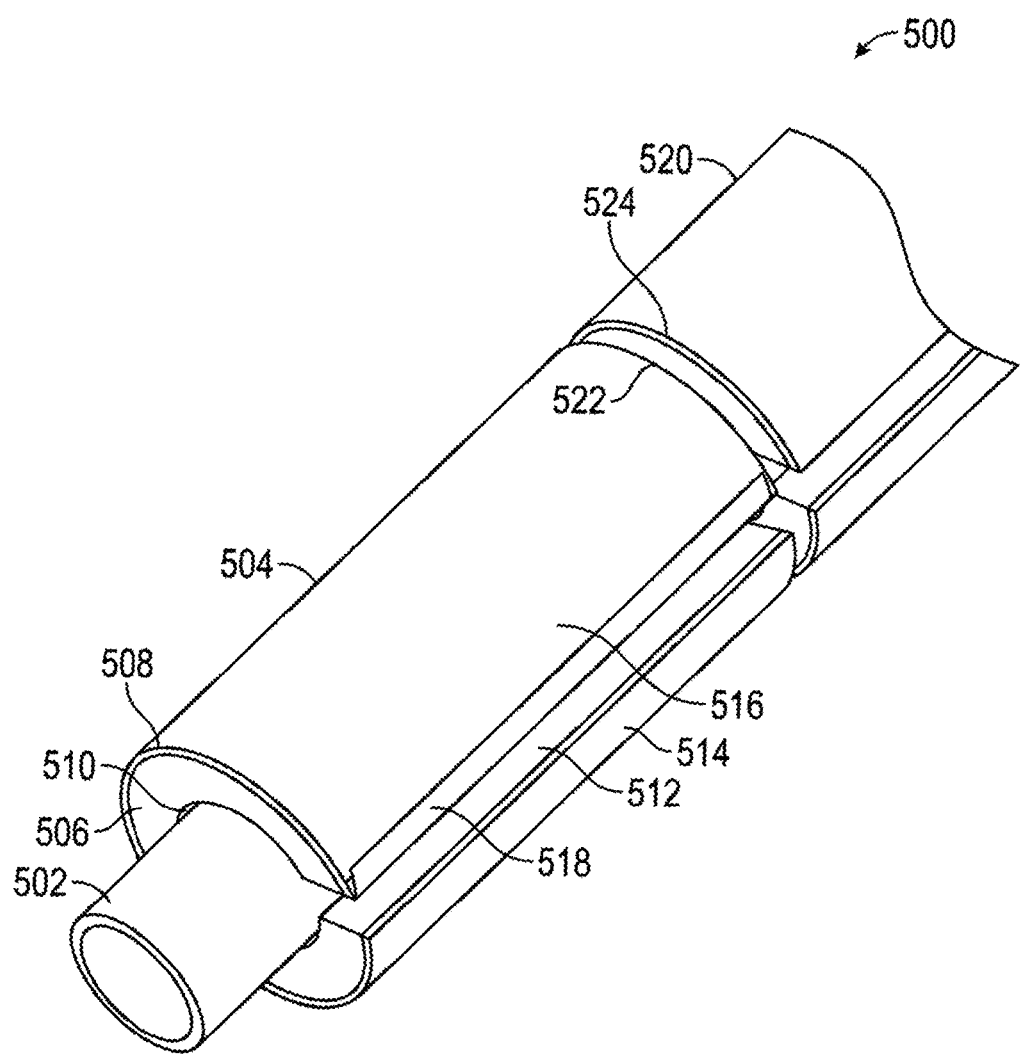
FIG. 5. is a perspective view illustrating two abutting laminate-faced pipe insulation sections surrounding a pipe.

FIG. 5 illustrates pipe insulating use 500 of insulated pipe jacket 504. Pipe jacket 504 is composed of pre-formed cylindrical core insulation 506 having an interior surface 510, an exterior surface 508, and has a longitudinal slit 512 to facilitate installation around pipe 502. Fixed to exterior surface 508 is a laminate 514 having an exposed primer-treated polymer surface. Once pipe jacket 504 is wrapped around pipe 502, longitudinal slit 512 can be closed using pressure-sensitive seam tape 518 to provide a uniform surface. Where a second pipe jacket 520 abuts pipe jacket 504, the abutted edges 522 and 524 can be closed using pressure sensitive seam tape (not shown) to provide a vapor-tight seal and uniform surface. Alternately, in lieu of, or in combination with tape closure systems, water-based or solvent-based mastics can be used to seal lap seams and butt joints.

Figure 6:
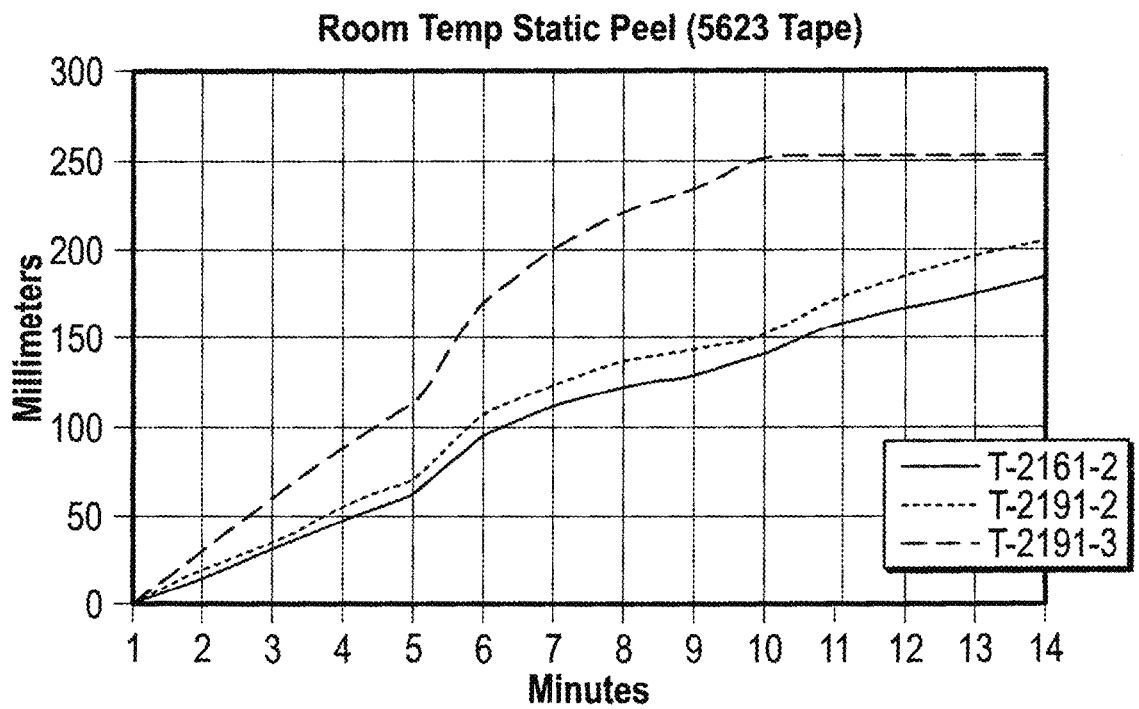
FIG. 6 is a table and graph summarizing comparative room-temperature static peel testing of pressure sensitive tape on pipe jackets.

FIG. 6 is a table and graph summarizing a static peel test conducted at room temperature (about 72 degrees Fahrenheit) using a sample, pressure-sensitive adhesive tape (model 5623, Venture Tape Corp., Rockland Md.) against laminates with an exposed, polymer surface. In this test, 300 grams of force was applied to the tape. The T-2161-2 facing is a matte polypropylene film without integral antistat. The T-2191-2 and T-2191-3 facings are modified matte films with intermediate and high levels of integral antistats, respectively. In the exemplary static peel test, the facings without the antistat had significantly less peeling than the facings with the antistat. For example, after about 10 minutes, the facings without the antistat peeled less than 150 mm, while the facing with the highest level of the antistat peeled over 230 mm.

Figure 7:
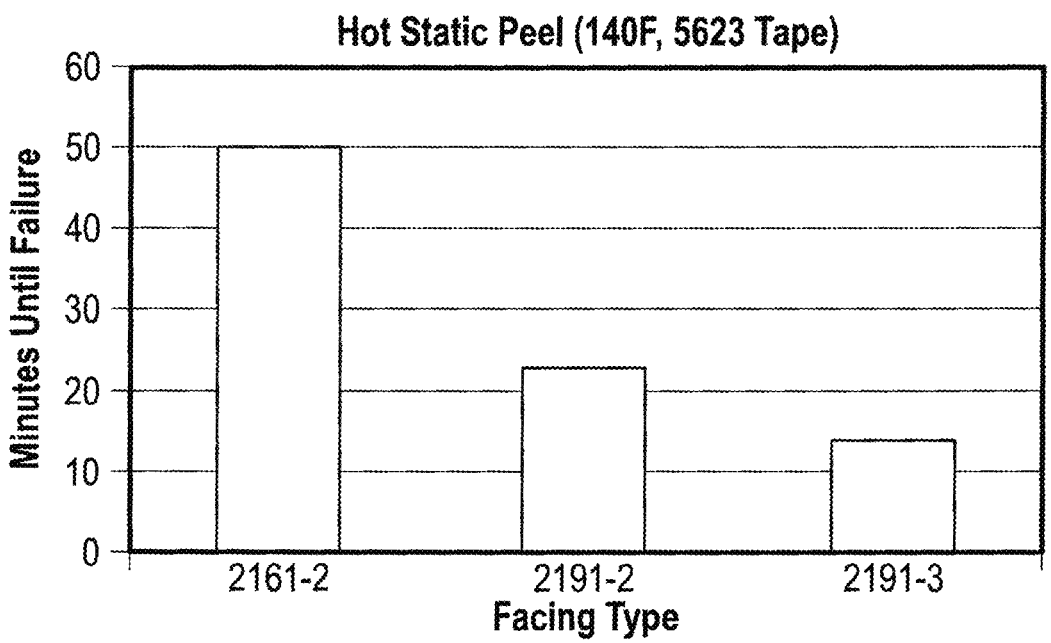
FIG. 7 is a table and graph summarizing comparative elevated-temperature static peel testing of pressure sensitive tape on pipe jackets.

FIG. 7 is a table and graph summarizing a static peel test conducted at elevated temperature (140 degrees Fahrenheit) using a sample, pressure-sensitive adhesive tape (model 5623, Venture Tape Corp., Rockland Mass.) against laminates with an exposed polymer surface. The T-2191-2 and T-2191-3 facings, with the integral anti-stat, failed at less than 25 minutes, while the T-2161-2 facing did not fail until around 50 minutes.

FIG. 8 is a table summarizing two tests. The first test is a short-period adhesion test conducted at reduced temperatures (15 degrees Fahrenheit) using various pressure-sensitive adhesive tapes (Venture Tape Corp., Rockland Md.) against a candidate polymer-surfaced laminate with and without a primer-treatment to the polymer surface. Both SSL tape (self-seal lap tape) and butt strip tape were evaluated. Primer-treated laminates had substantially higher adhesion properties.

The second test was a similar adhesion test conducted over a longer period (3 days) outdoors at elevated temperatures (28 degrees Fahrenheit) using various pressure sensitive adhesive tapes against a candidate polymer-surfaced laminate with and without a primer-treatment to the polymer surface. Again, primer-treated laminates had substantially higher adhesion properties.

The table shown in FIG. 8A quantifies low temperature tape adhesion. The data shown represents the peel force in lbs per 3" wide samples, for bonds formed at 20° F.

FIG. 9 is a table summarizing peel and shear testing conducted at room temperature that evaluated the adhesion of self-sealing lap tape to candidate laminates. The first column, Static Creep, is a 90 degree peel test with a fixed hanging weight of 300 grams. Laminates with the inventive primer (Primer/252 and Primer/ADH1) suffered less creep (between about 0.53 and about 1.05 in./hour, on average) than the laminate without the primer (ASJ+/252), which was about 6.01 in./hour.

The second column, Static Shear, is a 180 degree lap shear test with a fixed hanging weight of 1000 grams. Laminates with the inventive primer (Primer/252 and Primer/ADH1) took significantly longer times (between about 34.25 minutes and about 72.95 minutes, on average) to fail than the laminate without the primer (ASJ+/252), which took about 9.53 minutes, on average.

The third column, Dynamic Peel, is a peel test conducted using an electronic tensile tester, such as an Instron to mechanically peel the samples apart. Laminates with the inventive primer (Primer/252 and Primer/ADH1) required higher forces (between about 2.7 lb./in. and about 3.52 lb./in., on average) to peel apart than the laminate without the primer (ASJ+/252), which was about 2.13 lb./in., on average.

FIG. 10 is a table summarizing dust accumulation tests conducted on candidate laminates. The laminate samples with primer coating and integral anti-stat showed significantly less dust accumulation. A sample with no integral anti-stat in polymer film and no coating resulted in about 102.1 mg dust/100 in$^2$. The sample was placed in a horizontal position and exposed to dust. The sample was tilted vertically upright to allow non-adhering dust to fall away from the sample. The weight of the dust that adhered to the samples was then measured.

A sample with integral anti-stat in polymer film and no primer coating resulted in about 50.6 mg/100 in$^2$ over the same time period. Further, a sample with integral anti-stat in polymer film and a primer coating resulted in about 42.1 mg/100 in$^2$ over the same time period. Additionally, a sample with integral anti-stat in polymer film and a primer coating resulted in less than about 12.7 mg/100 in$^2$ over the same time period.

Figure 11:
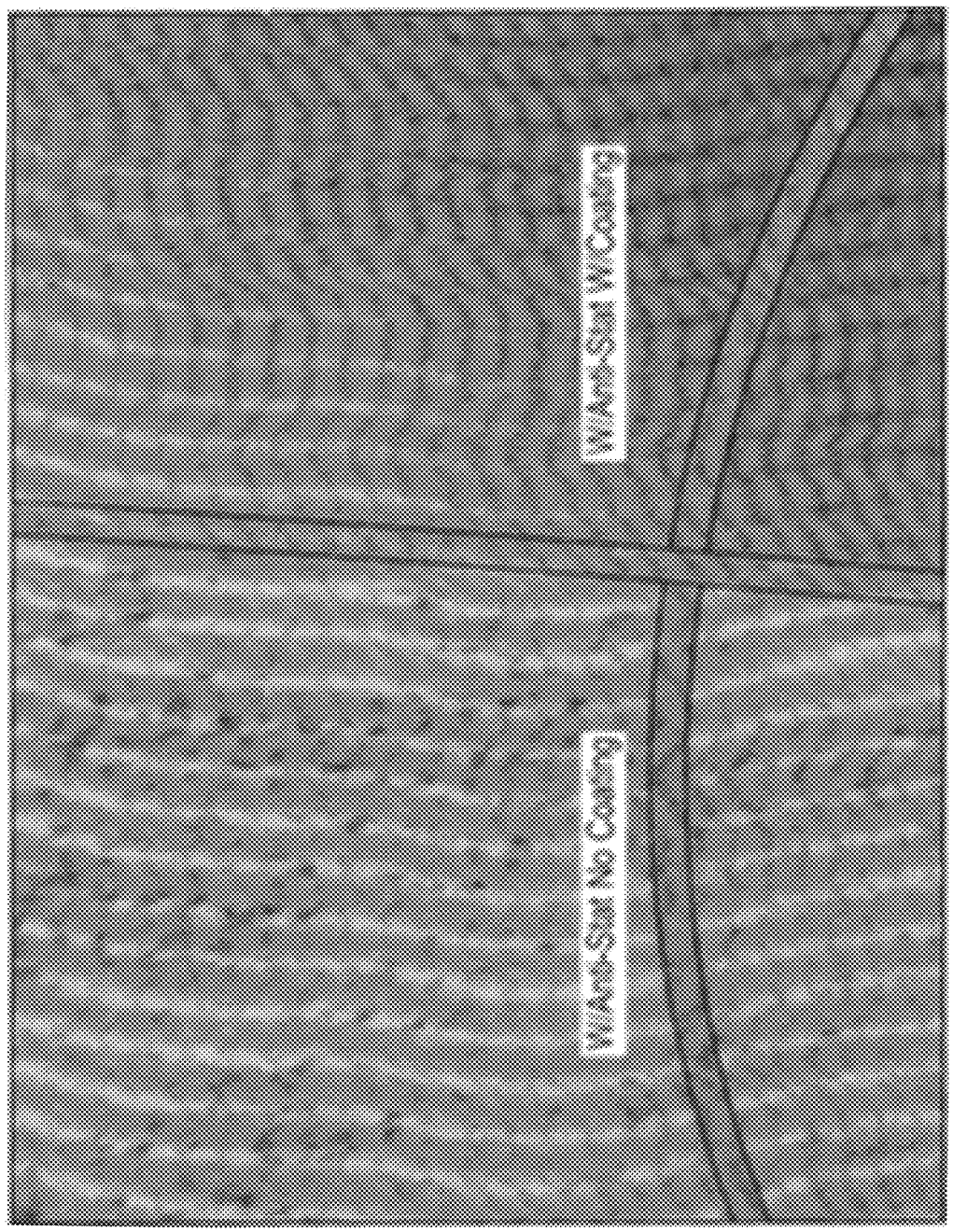
FIG. 11 is a photograph showing comparative dust accumulation testing of two identical laminates that contain integral anti-stats; the sample on the right has the primer coating and the sample of the left does not.

FIG. 11 is a black and white photograph depicting candidate laminate sheets exposed to dust for visual comparison of accumulated dust.

Figure 12:
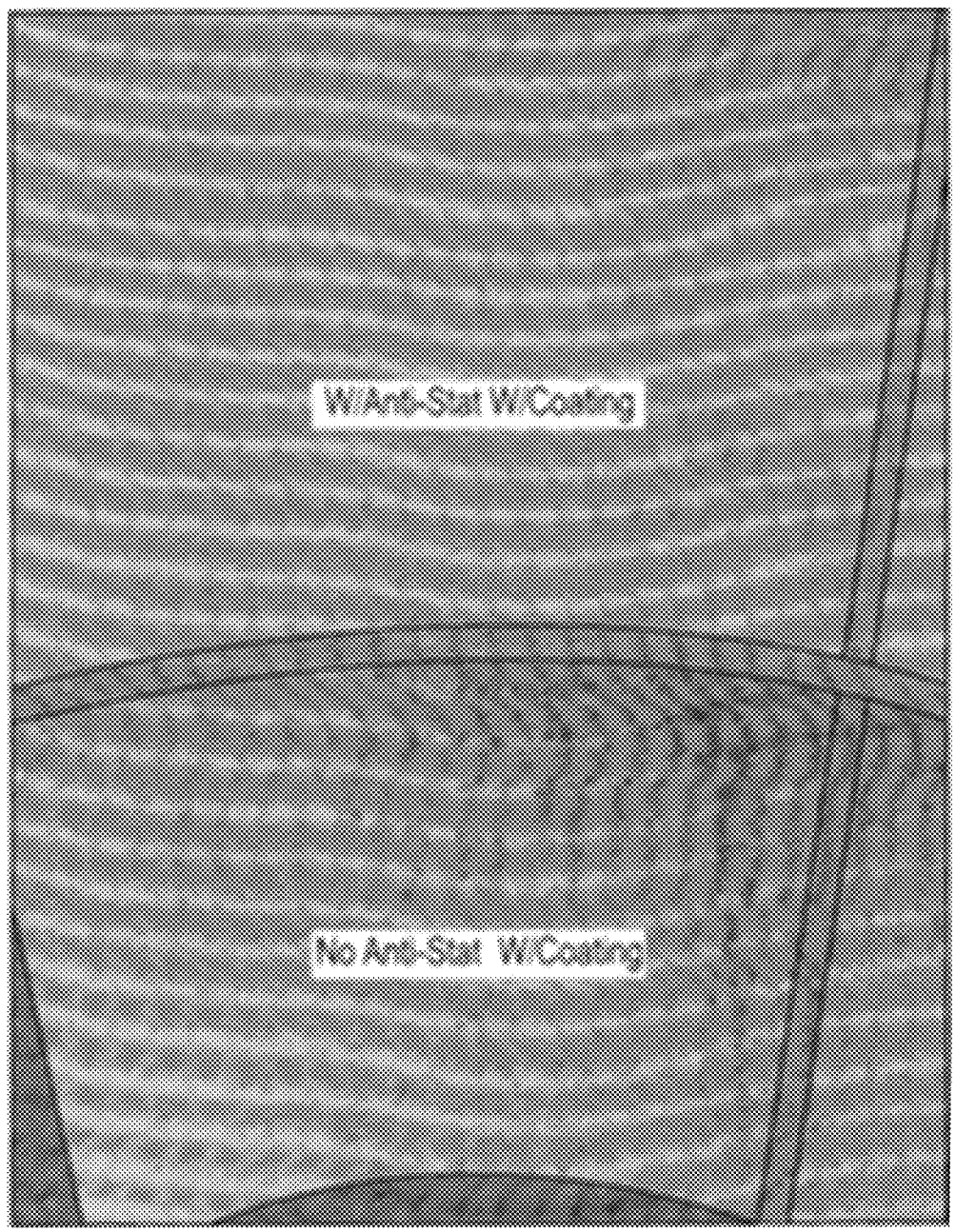
FIG. 12 is a photograph showing comparative dust accumulation testing of primer coated laminates, with and without integral anti-stat.

FIG. 12 is a black and white photograph depicting candidate laminate sheets exposed to dust for visual comparison of accumulated dust.

Figure 13:
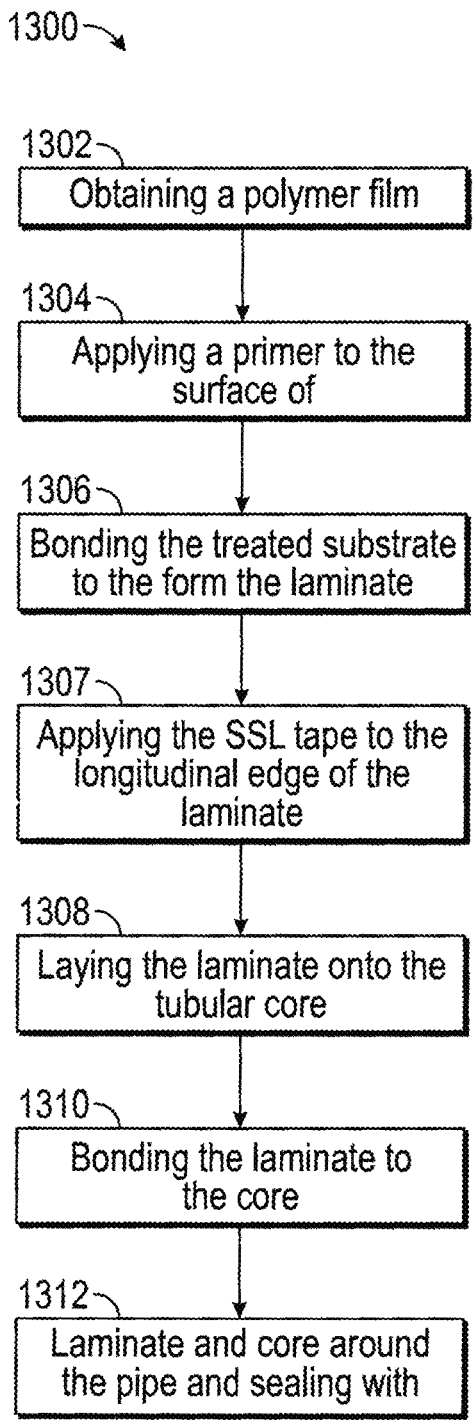
FIG. 13 is a schematic of a method for manufacturing and installing a pipe jacket.

FIG. 13 is a schematic of a method of manufacturing a primer-treated, polymer-faced laminate pipe jacket and installing it on a length of pipe. The method includes the steps of obtaining a polymer film substrate 1302, applying a primer to the surface of the substrate 1304, bonding the treated substrate to additional layers of material to form a laminate 1306, applying a strip of SSL tape to the longitudinal edge of the laminate 1307, laying the laminate onto a substantially tubular core of insulation 1308, bonding the laminate to the tubular core 1310 to form a pipe jacket, and wrapping the pipe jacket around a pipe and sealing with tape 1312.

FIG. 14 is a table illustrating comparative Mullen Burst results of an inventive film versus a prior art film, before and after accelerated UV exposure for 3000 hrs and 6000 hrs. A Mullen Burst Test measures the force required, in PSI, to rupture the polymer film.

As can be seen in FIG. 14, the average force required to rupture an inventive film prior to exposure is about 35.5 lbs and the average force required to rupture a prior art film prior to exposure is about 33 lbs. After 3000 hours of UV exposure, the inventive film has lost only about 8.5% of its initial strength (retaining about 91.5% of its initial strength), while the prior art film has lost about 39.4% of its original strength (retaining about 60.6% of its initial strength). After 6000 hours of UV exposure, the inventive film has lost only about 25.4% of its initial strength (retaining about 74.6% of its initial strength), while the prior art film has lost about 81.8% of its original strength (retaining about 18.2% of its initial strength).

Although the invention is illustrated and described herein with reference to specific embodiments, the invention is not intended to be limited to the details shown. Rather, various modifications may be made in the details within the scope and range of the equivalents of the claims and without departing from the invention.

We claim:

1. A surface-treated polymer film comprising:
   a polymer film substrate having a first surface and an opposing second surface;
   a primer applied to the first surface of the substrate such that the primer is exposed, the primer being a polymer;
   an adhesive directly applied to the second surface of the substrate; and
   a laminate applied to the adhesive, the laminate comprising at least one each of, in order: a base layer, a scrim layer, and a media sheet layer facing the second surface of the substrate.

2. The surface-treated polymer film according to claim 1, wherein the polymer substrate is selected from the group consisting of acrylic, polypropylene, polyethylene, polyvinyl chloride, nylon, polyvinylidene chloride, polyurethane, polyethyleneterephthalate, thermoplastic polyolefin, polyvinylfluoride, polyvinylidene flouride, polyethylene napthalate, polyimide polyamide, and polystyrene, and mixtures thereof.

3. The surface-treated polymer film according to claim 1, wherein the primer comprises a light-stable polymer.

4. The surface-treated polymer film according to claim 1, wherein, after 3000 hours of ultraviolet exposure, the film retains about 90% of its initial strength.

5. The surface-treated polymer film according to claim 4, wherein, after 6000 hours of ultraviolet exposure, the film retains about 75% of its initial strength.

6. The surface-treated polymer film according to claim 1, further comprising an anti-static compound applied to the first surface of the substrate.

7. The surface-treated polymer film according to claim 6, wherein a pressure sensitive tape peels off the substrate a distance of less than 254 millimeters after 10 minutes when the tape is pulled with a force of about 300 grams.

8. The surface-treated polymer film according to claim 6, wherein a pressure sensitive tape remains applied to the substrate after about 50 minutes at a temperature of about 140 degrees Fahrenheit.

9. The surface-treated polymer film according to claim 6, wherein less than 51 mg/100in$^2$ of dust adheres to the first surface of the substrate after performing the steps of:
   a. laying the film in a horizontal position;
   b. exposing the film to dust;
   c. moving the film to a vertical position to allow non-adhering dust to fall away from the film; and
   d. measuring the weight of the dust adhering to the film.

10. The surface-treated polymer film according to claim 9, wherein a primer coating is applied to the first surface of the substrate, and wherein less than 42 mg/100in$^2$ of dust adheres to the first surface of the substrate after performing steps a-d.

11. An insulation material having an exposed primer surface, the material comprising:
    an insulation core having a first core surface;
    a laminate affixed to the first core surface, the laminate comprising:
       a polymer film substrate having a first substrate surface and an opposing second substrate surface;
       an exposed primer applied to the first substrate surface, the primer being a polymer;
       an adhesive directly applied to the second substrate surface; and
       a laminate layer applied to the adhesive, the laminate layer comprising at least one each of, in order, a base layer, a scrim layer, and a media sheet layer facing the second surface of the substrate.

12. The insulation material according to claim 11, wherein the insulation core is cylindrically shaped.

13. The insulation material according to claim 11, wherein the insulation is one of a flat board, a flexible batt, and a blanket.

14. A method of insulating a material, the method comprising the steps of:
    a) providing a polymer film substrate having a first surface and a second surface;
    b) applying a primer to the first surface, the primer being a cross-linked polymer;
    c) applying an adhesive directly to the second surface;
    d) bonding a laminate layer to the second surface;
    e) applying a strip of self seal lap tape to a longitudinal edge of the laminate;
    f) applying the laminate layer over an insulation material such that the first surface with the primer is exposed; and
    g) placing the laminated insulation material over a surface to be insulated such that the first surface with the primer is exposed.

15. The method according to claim 14, wherein the insulation material in step e) is cylindrically shaped.

16. The method according to claim 15, wherein the material to be insulated comprises a pipe.

* * * * *